June 21, 1966   T. BUDZICH   3,256,830
PRESSURE COMPENSATOR UNLOADING CONTROL
Filed March 16, 1964
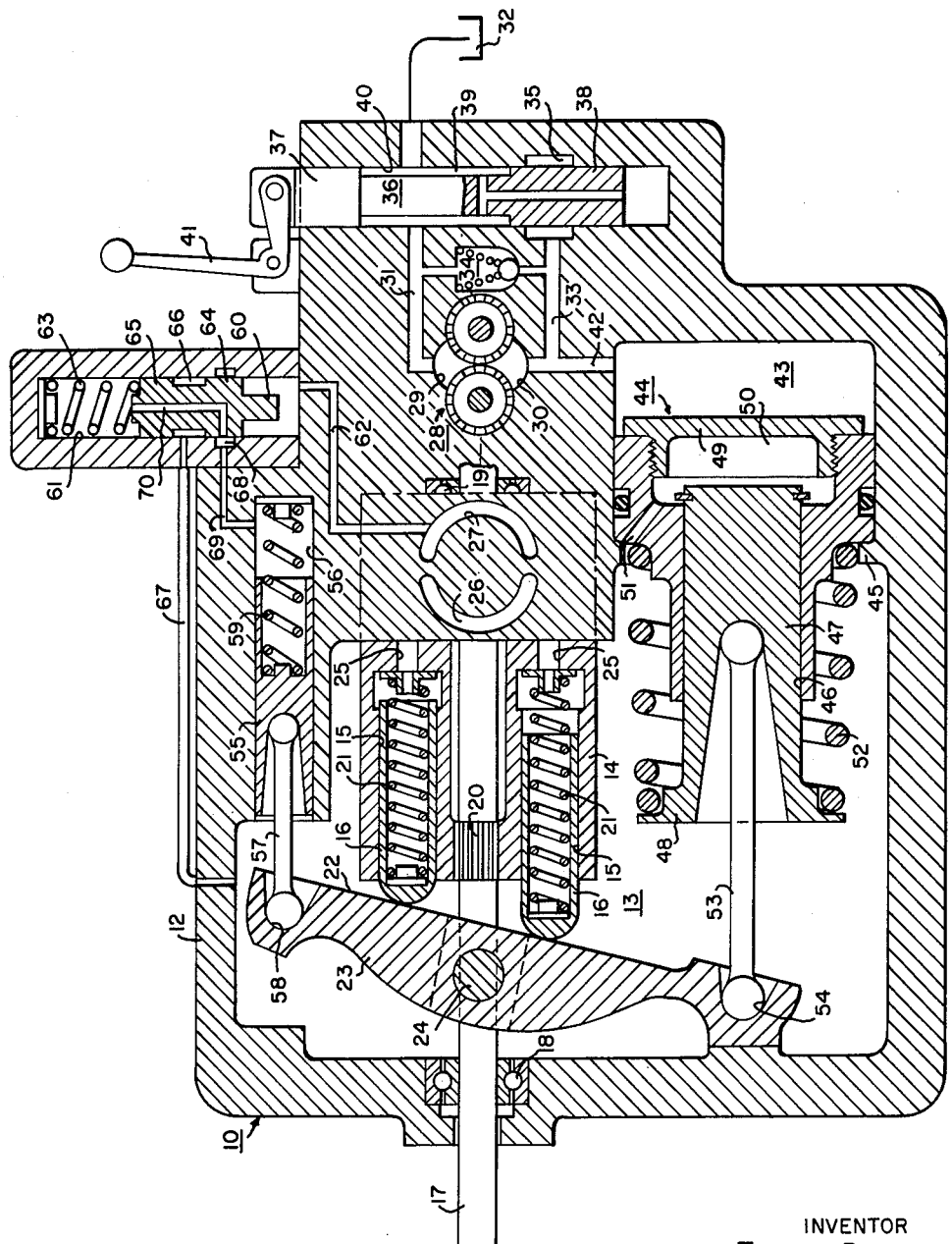
INVENTOR
TADEUSZ BUDZICH
BY William N. Hogg
ATTORNEY United States Patent Office 3,256,830
Patented June 21, 1966

3,256,830
PRESSURE COMPENSATOR UNLOADING
CONTROL
Tadeusz Budzich, 3344 Colwyn Road,
Cleveland 20, Ohio
Filed Mar. 16, 1964, Ser. No. 352,276
17 Claims. (Cl. 103—120)

The present invention relates generally to a fluid pressure control system for use with variable displacement fluid pump and more particularly to a fluid pressure control system that varies the displacement of a pump to maintain the fluid pressure at a relatively constant level.

In still more particular aspects this invention relates to unloading controls for pressure control systems used with variable displacement fluid pumps.

Automatic controls of a variable displacement pump which vary the displacement of the pump to maintain a constant outlet pressure are well known in the art. Generally, controlly systems of this type operate a displacement changing member of the pump that is biased towards position of maximum flow by a spring. A hydraulic control piston arrangement exerts a force on the displacement changing member in the direction opposite that of the biasing spring. In a variable displacement pump equipped with such a control, with the pump discharge line directed to low pressure zone such as the pump reservoir, the pump will automatically, under the action of control, assume the position equivalent to maximum flow. With the discharge line of the pump functionally closed, the control will bring the displacement changing mechanism to a position equivalent to near zero flow, the pump working at the control pressure level, supplying just enough pressure fluid to offset the internal leakage of the pump. With the control in both positions, as described above, the pump is using a substantial amount of power. When working at very low pressure in this position of maximum flow a large volume of oil is continuously circulated through the hydraulic lines, providing large throttling losses. With the pump working near its zero flow position at relatively high pressure, the pump is subject to full wear and losses associated with high discharge pressures. Since the two above described control positions are equivalent to the minimum power utilization of the variable displacement pump and since even this minimum absorption of power is quite considerable, the pump equipped with conventional pressure compensated control suffers from the above serious disadvantages, of having large losses at minimum power requirements.

It is therefore a principal object of this invention to provide an unloading control for fluid pressure control systems which system automatically varies the displacement member of the pump in response to changes in the system pressure to maintain the system pressure at a substantially constant level.

Another object of this invention is to provide an unloading control for a fluid pressure control system which system automatically varies the displacement member of the pump in response to changes in the system pressure to maintain the system pressure at a substantially constant level, and which unloading control will bring the displacement member of the pump into position equivalent to zero flow condition, with zero discharge pressure being maintained at the outlet of the pump.

Still another object of this invention is to provide an unloading control of a fluid pressure control system which unloading control utilizes the force of the piston return springs of the pump in providing the adjusting action on the tiltable cam plate to bring it into the zero position on a signal from the unloading control.

Still another object of this invention is to provide fluid pressure control system with the unloading control to reduce the power losses of a pump driven by a power source which periodically is not required to supply fluid energy.

These and other objects of the invention will be apparent from the following description and drawing, in which:

The single figure is a longitudinal sectional view somewhat schematic of a variable displacement pump embodying a fluid pressure control system and unloading control therefor of this invention.

Referring now to the drawing, in the single figure a variable displacement pump 10 is shown having a housing 12 that defines an internal cavity 13, in which a cylinder barrel 14 is disposed. The cylinder barrel 14 is provided with a plurality of cylinder bores 15, slidably guiding pistons 16. A pump shaft 17, journalled in the housing 12 by bearings 18 and 19, drivingly engages the cylinder barrel 14 in a region of splined connection 20. Pistons 16 are biased by piston return springs 21 toward reaction surface 22 of a trunnion 23. The trunnion 23 is mounted for limited rotation in respect to housing 12 by trunnion pins 24. The cylinder bores 15, of cylinder barrel 14, terminate in timing passages 25, which communicate with diagrammatically shown low pressure timing slot 26 and high pressure timing slot 27.

The pump shaft 17 drivingly engages a diagramatically shown gear pump designated generally as 28. The gear pump 28 is provided with a suction port 29 and a discharge port 30. The suction port 29 is connected through passage 31 to diagramatically shown low pressure reservoir 32. Discharge port 30 is connected through a passage 33 to diagramatically shown conventional relief valve 34 interposed between passages 33 and 31. Passage 33 terminates in an annular slot 35. A selector spool generally designated as 36, having lands 37 and 38 defining therebetween an annular space 39, is slidably guided in valve bore 40 which intersects annular slot 35. The spool 36 is connected to control lever 41 for movement in the bore 40. The discharge port 30 is connected through drilling 42 with an unloading cylinder bore 43. An unloading piston designated generally as 44 is slidably guided in the unloading cylinder bore 43 which bore terminates in an annular stop ring 45. The unloading piston 44 contains a bore 46 slidably guiding stem 47 of spring guide 48. An end cap 49 closes the piston 44 and forms a space 50 in the unloading piston 44. The space 50 is vented to low pressure by drilling 51. An actuating spring 52 is interposed between the unloading piston 44 and the spring guide 48. The spring guide 48 is operationally connected through a first push rod 53 to a first socket 54, formed in the trunnion 23.

A control piston 55 is provided which is guided in control bore 56 in the housing 12 and functionally engages through a second push rod 57 a second socket 58, formed in the trunion 23. A control spring 59 biases control piston 55 toward the trunnion 23.

A control spool 60 is provided which is slidably disposed in control spool bore 61. One end of said bore 61 is in direct communication through duct 62 with the high pressure timing slot 27. The control spool 60 is biased toward duct 62 by spool control spring 63. The control spool 60 is equipped with a metering land 64 and a sealing land 65 defining therebetween an annular space 66 communicating through passage 67 with internal cavity 13. A control pressure annulus 68 is provided around the bore 61 and communicates through duct 69 with control bore 56 and through duct 70 formed in the spool 60 with the control spool bore 61.

Operation

The angle of inclination of the reaction surface 22 of trunnion 23 in respect to the axis of rotation of cylinder barrel 14 will determine the length of the pumping stroke and therefore the volume flow from the pump. The pumping action of the pistons 16 in a well known manner will take fluid from the low pressure timing slot 26 and discharge it to the high pressure timing slot 27. The low pressure timing slot 26 is connected to inlet pump port (not shown) and the high pressure timing slot 27 is connected to the discharge port of the pump, not shown. The pump shaft 17 is drivingly connected to the gear pump 28. The rotation of the gears in the gear pump 28 will induce fluid flow from the low pressure reservoir 32 through passage 31 to suction port 29. The fluid is then transferred by the gear pump 28 to discharge port 30 and through drilling 42 to the unloading cylinder 43. With unloading piston 44, as shown in the figure, resting against stop 45, the pressure from the gear pump 28 will build up to the preload pressure of the relief valve 34 and the fluid flow will then be diverted through passage 33 and relief valve 34 to passage 31 and therefore suction port 29 maintaining the pressure level set by the relief valve 34. The fluid pressure equivalent to setting of the relief valve 34 will react against cross-section area of unloading piston 44, maintaining it against stop 45. Thus the generated force will maintain actuating spring 52 in its compressed position and the biasing force of the actuating spring 52, transmitted through the first push rod 53, will tilt the trunnion 23 to its maximum angular position as shown in the figure. The pumping action of the pistons will cause the pressure in high pressure timing slot 27 to rise. This rise in pressure, transmitted through duct 62, will react on the lower end of the control spool 60 which faces duct 62 tending to move it against the bias of the control spring 63 upwardly as seen in the figure. This will move the metering land 64 up, connecting the control pressure annulus 68 to the high pressure timing slot 27. The rising pressure in the control pressure annulus 68 will be transmitted through duct 70 to the control spool bore 61. The rising pressure in control spool bore 61 reacting on the cross-section area of the control spool 60 will supplement the biasing force of the control spring 63, closing the control pressure annulus from high pressure timing slot 27. In this way the control spool 60 will automatically maintain a pressure in the control pressure annulus 68 proportional to the discharge pressure in excess of setting of the control spring 63. The rising fluid pressure in control pressure annulus 68 will also be conducted through duct 69 to control bore 56 and will react on the cross-section area of control piston 55. The generated force on the control piston 55 is transmitted through the second push rod 57, to the trunnion 23, tending to rotate the trunnion 23 around trunnion pins 24, against the biasing force of the actuating spring 52. When the hydraulic force, developed on the control piston 55, becomes greater than the preload of actuating spring 52, the trunnion 23 will rotate, reducing its angle of inclination in respect to axis of rotation of pump shaft 17. This reduction in angle of inclination will effectively reduce the pump flow which will reduce the pressure in the high pressure timing slot 27. When the pressure in the high pressure timing slot is reduced the control spool 60 under action of control spring 63 will be urged downwardly as seen in the figure, opening the control pressure annulus 68 to annulus 66, which communicates through passage 67 to low pressure cavity 13. The pressure in the control bore 56 will therefore drop and the trunnion 23 under action of actuating spring 52 will increase its angular inclination effectively increasing the pump flow and therefore the pressure. In this way pressure signal from high pressure timing slot 27 will be translated through the action of the control spool 60 into proportional equivalent angular position of trunnion 23 and therefore into equivalent flow out of the pump.

Therefore the flow out of the pump will vary inversely with the rise in the system pressure. At a certain specified pressure level in the high pressure slot 27, equivalent to specific preload in the control spring 63, the trunnion 23 will assume a perpendicular position in respect to axis of rotation of pump shaft 17. This angular inclination of the trunnion 23 corresponds to zero pump flow.

If the pressure in the high pressure timing slot 27 should be reduced to that of the low pressure zone, such as may happen when motors driven by the pump are unloaded, or idling, the control would cause the trunnion to assume maximum angular position and therefore cause a full flow to be circulated. This, as explained above, puts an undue burden on the pump when it is not required for work. Conversely, if the pressure in the high pressure slot 27 is raised as by blocking the discharge of the pump when discharge is not required, the action of the control would cause the trunnion to assume a minimum angle to provide high pressure fluid at the regulated full pressure for leakage losses, thus subjecting the pump to full wear and losses associated with the high discharge pressure. The controls of this pump provide for the unloading of the pump to a zero pumping low pressure condition. The unloading is accomplished in the following manner:

Movement of the control lever 41 from left to right as seen in the figure will move selector spool 36 downwardly connecting annular slot 35 with passage 31 and suction port 29 through annular space 39. The discharge fluid from the discharge port 30 will be diverted through passage 33, annular slot 35, annular space 39, and passage 31 to suction port 29, thus unloading the gear pump 28 and preventing pressure being generated at the discharge port. The drop in discharge pressure of the gear pump will cause the pressure in the unloading cylinder 43 to drop and the unloading piston 44 will be moved to right under combined action of spring 59, and piston return springs 21. The trunnion 23 will assume a neutral vertical position, (i.e. normal to the axis of the shaft 17), equivalent to zero pump flow at zero discharge pressure, in high pressure timing slot 27. Since the variable pump under this condition does not generate pressure nor circulate flow it will be working at a minimum parasitic power loss.

Actuation of the selector spool 36 from this unloading position back up to the position shown in the drawing will close off the annular slot 35 from annular space 39. The pumping element 28 will immediately generate pressure again equivalent to setting of the relief valve 34, forcibly moving unloading piston 44 against the stop 45, compressing actuating spring 52 and therefore activating the automatic control. The force developed in actuating spring 52 will move the trunnion 23 from its nutral position, increasing the pump flow. As soon as the pressure in the high pressure timing slot 27 has risen sufficiently, the flow out of the pump will be automatically adjusted, to maintain a relatively constant discharge pressure as explained.

Therefore actuation of the slector spool 36 will either completely unload the control maintaining the pump at an absolute minimum parasitic horsepower force level or activate the unloading control. When activated the unloading control will respond rapidly bringing the pump under operation of the automatic pressure responsive control.

Although one embodiment of this invention has been shown and described, various adaptations and modifications can be made without departing from the scope of the appended claims.

What is claimed is:

1. A fluid pressure energy translating device comprising pumping mechanism, flow changing means arranged to vary the capacity of said pumping mechanism, first biasing means disposed to urge said flow changing means toward the position of maximum flow, second biasing means disposed to urge said flow changing means toward the position of minimum flow, pressure responsive control means operatively interconnected with at least one of said biasing means to vary the capacity of said flow changing means to maintain a relatively constant preselected control discharge pressure of the device, and unloading means to selectively adjust the biasing force of at least one of said biasing means so that the biasing force of the first biasing means is less than the biasing force of the second biasing means to thereby permit said second biasing means to move said flow changing means into the minimum flow position whereby said device can be maintained in an unloaded conditions of minimum flow at minimum discharge pressure.

2. A fluid pressure energy translating device comprising a pumping mechanism, flow changing means arranged to vary the capacity of said pumping mechanism, first biasing means disposed to urge said flow changing means toward the position of maximum flow, second biasing means disposed to urge said flow changing means toward the position of minimum flow, pressure responsive control means operatively interconnected with at least one of said biasing means to vary the capacity of said flow changing means to maintain a relatively constant preselected control discharge pressure of the device, and means to selectively adjust the biasing force of said first biasing means to a value less than the force of the second biasing means to thereby permit said fluid actuating means to move said flow changing means into minimum flow position whereby said device can be maintained in an unloaded condition of minimum flow at minimum discharge pressure.

3. A fluid pressure energy translating device comprising a pumping mechanism, flow changing means arranged to vary the capacity of said pumping mechanism, first biasing means disposed to urge said flow changing means toward the position of maximum flow, second biasing means disposed to urge said flow changing means toward position of minimum flow, pressure responsive control means operatively interconnected with said second biasing means to vary the capacity of said flow changing means to maintain a relatively constant control discharge pressure of the device, and unloading means to selectively adjust the biasing force of at least one of said biasing means so that the biasing force of the first biasing means is at less than the force of the second biasing means to thereby permit said second biasing means to move said flow changing means into minimum flow position whereby said device can be maintained in an unloaded condition of minimum flow at minimum discharge pressure.

4. A fluid pressure energy translating device comprising a pumping mechanism, flow changing means arranged to vary the capacity of said pumping mechanism, first biasing means disposed to urge said flow changing means toward the position of maximum flow, second biasing means disposed to urge said flow changing means toward the position of minimum flow, pressure responsive control means operatively interconnected with said second biasing means to vary the capacity of said flow changing means to maintain a relatively constant control discharge pressure of the device, and unloading means to selectively reduce the biasing force of said first biasing means to a value less than that of the second biasing means to thereby permit said second biasing means to move said flow changing means into minimum flow position whereby said device can be maintained in an unloaded condition of minimum flow at minimum discharge pressure.

5. A fluid pressure energy translating device comprising a pumping mechanism, flow changing means arranged to vary the capacity of said pumping mechanism, first biasing means including spring means disposed to urge said flow changing means toward the position of maximum flow, second biasing means including fluid actuating means disposed to urge said flow changing means toward position of minimum flow, pressure responsive control means operatively interconnected with said fluid actuating means to vary the capacity of said flow changing means to maintain a relatively constant preselected control discharge pressure of the device, and unloading means to selectively reduce the biasing force of said spring means to a value less than that of the second biasing means to thereby permit said fluid actuating means to move said flow changing means into the minimum flow position whereby said device can be maintained in unloaded condition of minimum flow at minimum discharge pressure.

6. A fluid pressure energy translating device comprising a housing with inlet and outlet ports, a cylinder barrel journalled in said housing, said cylinder barrel having cylinder bores with pistons mounted for reciprocation therein, means to reciprocate said pistons, valving means to sequentially connect in timed relation said cylinder bores with said inlet and outlet ports, stroke changing means to regulate the length of the stroke of said pistons, first biasing means including firt spring means diposed to urge said stroke changing means toward the position of maximum stroke length, second biasing means including fluid actuating means and second spring means disposed to urge said stroke changing means toward the position of minimum stroke length, pressure responsive control means disposed to operate said fluid actuating means to vary the stroke of said pistons to maintain a relatively constant discharge pressure, and unloading means to unload the biasing force of said first spring means to permit said second springs means to bring said stroke changing means into minimum stroke position whereby said device can be maintained in unloaded condition of minimum stroke at minimum discharge pressure.

7. The device of claim 6 further characterized by said first spring means developing force biasing said stroke changing means toward position of maximum stroke and said second spring mean developing force biasing said stroke changing means toward position of minimum stroke and opposing said first spring means, said force developed by said first spring means being subtantially larger than said force developed by said second spring means whereby said first spring means can bring said stroke changing mechanism into maximum stroke position against the bias of said second spring means.

8. The device of claim 6 further characterized by said unloading means including a fluid operated first spring support means.

9. A fluid pressure energy translating device comprising a housing with inlet and outlet ports, a cylinder barrel journalled in said housing, said cylinder barrel having cylinder bores with pistons mounted for reciprocation therein, means to reciprocate said pistons, valving means to sequentially connect in timed relation said cylinder bores with said inlet and outlet ports, stroke changing means to regulate the length of the stroke of said pistons, first biasing means including first spring means and fluid actuated spring support means disposed to urge said stroke changing means toward the position of maximum stroke length, second biasing means including second spring means and fluid actuating means disposed to urge said stroke changing means toward the position of minimum stroke length, pressure responsive control means disposed to operate said fluid actuating means to vary the stroke of said pistons to maintain a relatively constant discharge pressure, an independent source of fluid pressure, and means to selectively connect and disconnect said independent source of fluid pressure to said fluid actuated spring support means, said fluid actuated spring support means being disposed to unload said first biasing means in response to change of fluid pressure from said independent source, whereby said device can be selectively maintained in the unloaded condition of minimum stroke at minimum discharge pressure.

10. The combination of claim 9 wherein said independent source of fluid pressure is provided by a pump.

11. The combination of claim 9 wherein said second spring means includes piston return springs.

12. The combination of claim 9 wherein said fluid actuating means includes a control piston, and said second spring means includes a control piston spring.

13. The combination of claim 12 wherein said second spring means includes piston return springs.

14. A fluid pressure energy translating device comprising a housing with inlet and outlet ports, a cylinder barrel journalled in said housing, said cylinder barrel having cylinder bores with pistons mounted for reciprocation therein, means to reciprocate said pistons, valving means to sequentially connect in timed relation said cylinder bores with said inlet and outlet ports, stroke changing means to regulate the length of the stroke of said pistons, first biasing means including first spring means and fluid actuated spring support means disposed to urge said stroke changing means toward the position of maximum stroke length, said fluid actuated spring support means including a chamber bore with a force piston slideably disposed therein, second biasing means including second spring means and fluid actuating means disposed to urge said stroke changing means toward the position of minimum stroke length, pressure responsive control means disposed to operate said fluid actuating means to vary the stroke of said pistons to maintain a relatively constant discharge pressure, an independent source of fluid pressure, and means to selectively connect and disconnect said independent source of fluid pressure to said chamber bore, said force piston being disposed to move to unload said first biasing means when said chamber bore is disconnected from the independent source of fluid pressure, whereby said device can be selectively maintained in the unloaded condition of minimum stroke at minimum discharge pressure.

15. The combination of claim 14 wherein said independent source of fluid pressure is supplied by a pump.

16. The combination of claim 15 further characterized by a relief valve disposed to regulate the pressure generated by said pump.

17. The combination of claim 15 wherein said means to connect and disconnect said independent source of fluid pressure to said chamber includes control valve means moveable between a first position wherein the discharge of said pump is connected to low pressure to remove pressure from said chamber and a second position to cause pressure build up at the discharge of said pump, to thereby cause pressure in said chamber.

References Cited by the Examiner

UNITED STATES PATENTS

| | | | |
|---|---|---|---|
| 2,731,569 | 1/1956 | Cardillo et al. | 103—162 |
| 3,153,899 | 10/1964 | Budzich et al. | 103—162 |

SAMUEL LEVINE, *Primary Examiner.*

R. M. VARGO, *Assistant Examiner.*